INVENTOR.
ROBERT D. LeBLEU
BY Jack M. Wiseman
ATTORNEY

April 28, 1970   R. D. LE BLEU   3,508,509
UNDERWATER VEHICLE
Original Filed Aug. 7, 1967   6 Sheets-Sheet 2

INVENTOR.
ROBERT D. LeBLEU
BY
Jack M. Wiseman
ATTORNEY

April 28, 1970 R. D. LE BLEU 3,508,509
UNDERWATER VEHICLE
Original Filed Aug. 7, 1967 6 Sheets-Sheet 3
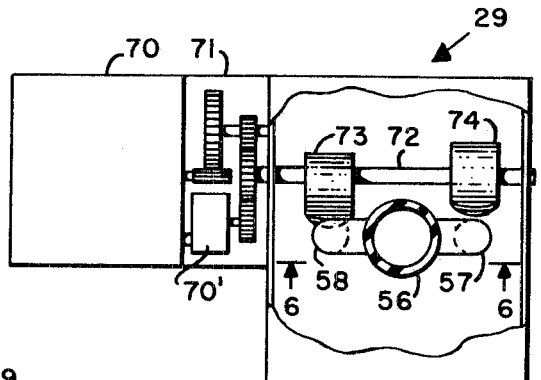
FIG. 5
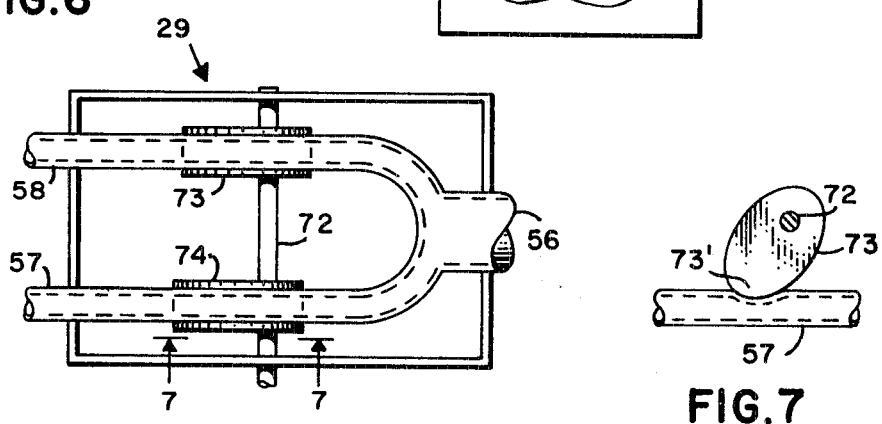
FIG. 6
FIG. 7
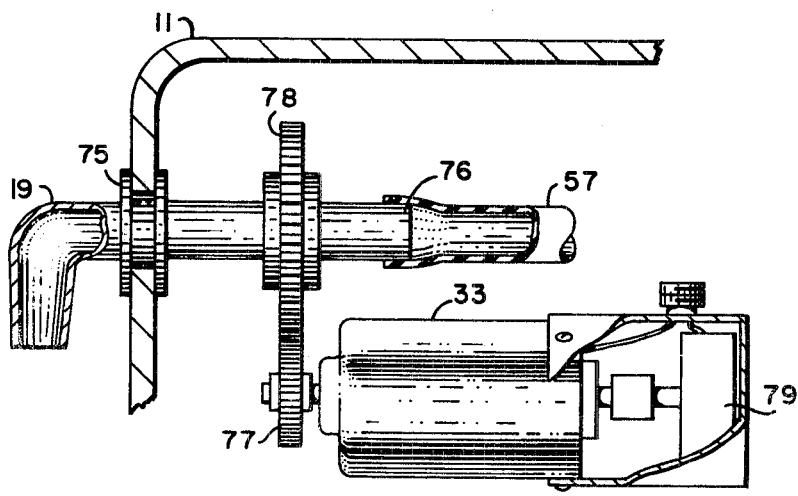
FIG. 8
INVENTOR.
ROBERT D. LeBLEU
BY
Jack M. Wiseman
ATTORNEY INVENTOR.
ROBERT D. LeBLEU

ATTORNEY

April 28, 1970   R. D. LE BLEU   3,508,509
UNDERWATER VEHICLE
Original Filed Aug. 7, 1967   6 Sheets-Sheet 6
FIG.13
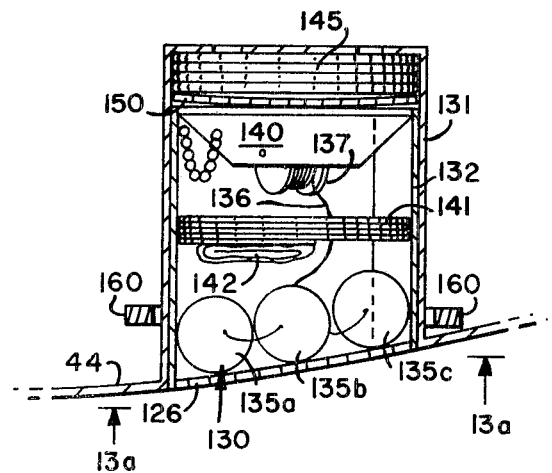
FIG.13a
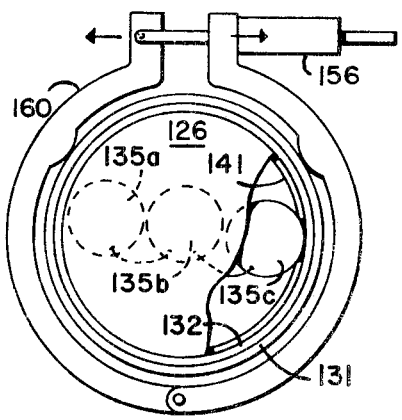
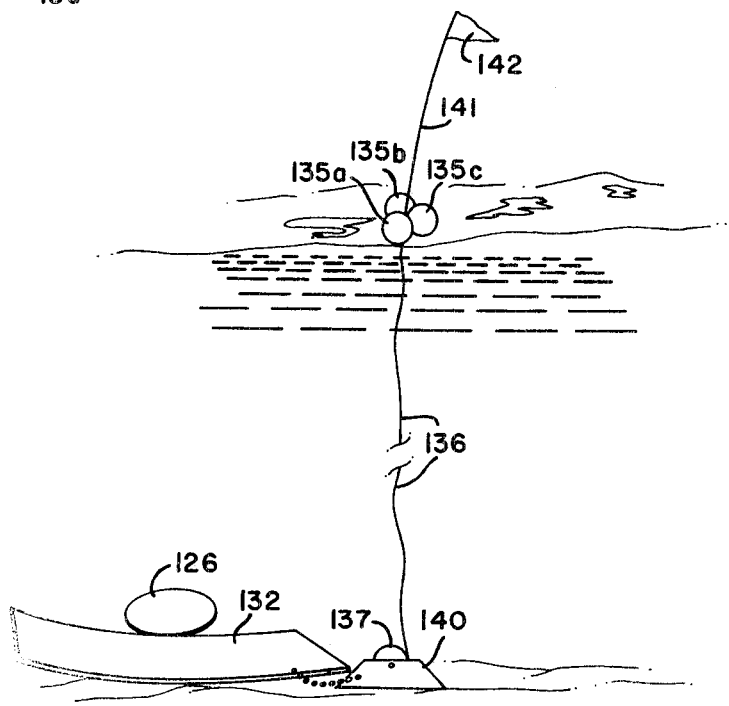
FIG.14
INVENTOR.
ROBERT D. LeBLEU
BY
ATTORNEY United States Patent Office 3,508,509
Patented Apr. 28, 1970

3,508,509
UNDERWATER VEHICLE
Robert D. Le Bleu, 512 Columbia St.,
Santa Cruz, Calif. 95060
Original application Aug. 7, 1967, Ser. No. 658,777.
Divided and this application Apr. 10, 1969, Ser.
No. 815,093
Int. Cl. B63g *8/24;* B63b *21/52*
U.S. Cl. 114—16                9 Claims

ABSTRACT OF THE DISCLOSURE

An underwater vehicle having a hull with an open ended flexible marker buoy compartment therein. A releasable clamping means holds the flexible compartment in contact with a cover. A spring forces the marker out when the clamping means is released. The marker has a buoyant means and an anchor.

---

This application is a divisional application of my pending application filed on Aug. 7, 1967, Ser. No. 658,777, for Underwater Vehicle.

The present invention relates in general to underwater vehicles, and more particularly to a small and lightweight vehicle which can be readily maneuvered for underwater observation with a television camera or other instrumentation.

Prior vehicles used for under water observations have been too costly and complex for widespread use. Moveover their construction does not permit the precise maneuverability and control which is required for moving around and observing small objects. Such observations are usually made by humna divers, which introduces severe limitations resulting from the relatively short depth to which a diver can descend, the relatively short time that a diver, especially one also engaging in physical activity, can remain underwater, and the extent to which a diver is able to accumulate and transmit information.

An object of the present invention is to overcome these and other limitations and disadvantages in the prior art by the provision of a small, economical and lightweight underwater vehicle which is readily controlled and maneuvered from the surface.

One feature of the present invention is the provision of a hull which is propelled and maneuvered by directing under controlled conditions water from the front, rear and both sides of the hull.

Another feature of the present invention is the provision of a hull which is rotatably mounted in a bridle assembly.

Another feature of the present invention is the provision of a pressurized gas system which maintains sufficient pressure in the wire-carrying air hoses of the vehicle to prevent water leakage.

Another feature of the present invention is the provision of a variable buoyancy trim tank having an air chamber and a water chamber whose relative volumes are varied in order to vary the buoyancy of the vehicle.

Another feature of the present invention is the provision of an illuminating system for an optical viewing device carried by the vehicle, said illumination system providing optical beams which intersect at the focal point of the optical viewing device so as to illuminate the object being observed without introducing interfering back scatter from the water.

These and other features and advantages of the present invention will become more apparent upon a consideration of the following description taken in connection with the accompanying drawing, wherein:

FIG. 5 is an enlarged cross-sectional view taken along line 5—5 in FIG. 3 to show a proportional valve employed in the underwater vehicle of the present invention;

FIG. 6 is an enlarged cross-sectional view taken along line 6—6 of FIG. 5 to further illustrate the proportional valve;

FIG. 7 is an enlarged cross-sectional view taken along line 7—7 in FIG. 6 to further illustrate the proportional valve;

FIG. 8 is an enlarged cross-sectional view taken along line 8—8 in FIG. 2 to illustrate a rotatable junction employed in the underwater vehicle of the present invention;

FIG. 13 is a side elevation of the bottom cover plate shown in FIG. 12 with a portion thereof removed to illustrate the structure of a marker buoy;

FIG. 13A is a section view taken along line 13A—13A of FIG. 13; and

FIG. 14 is a diagrammatic illustration of a marker buoy in operation.

Figure 1:
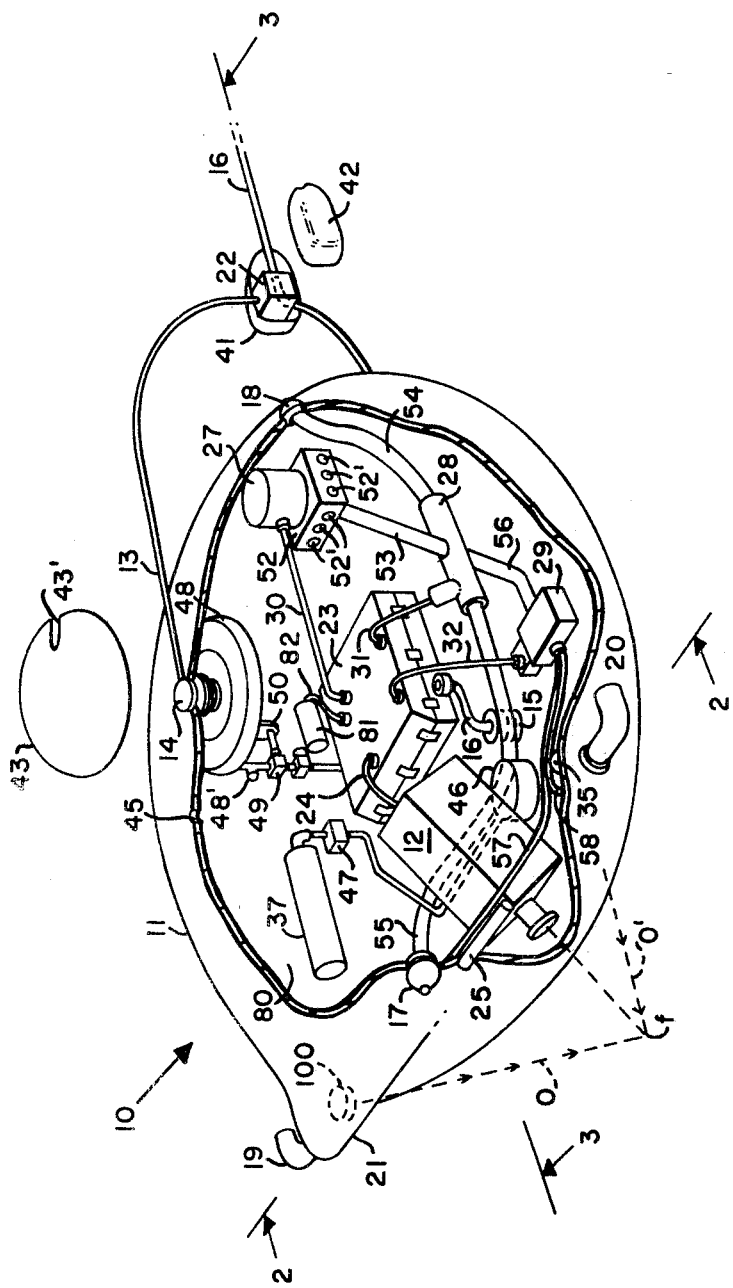
FIG. 1 is a perspective view, partly broken away and partly exploded, of an underwater vehicle embodying the present invention.

The underwater scanner vehicle 10 of the present invention comprises a lenticular-shaped fiberglass hull 11 (FIGS. 1–3) which carries a standard television camera 12 for viewing underwater objects. Typically, the hull 11 is four feet in diameter with a maximum internal vertical dimension or eighteen inches. The lens of the television camera 12 is mounted in an opening of the hull 11 with the optical axis of the camera directed downwards at an angle of approximately 45° from the horizontal. The hull 11 is rotatably mounted between the ends of a bifurcated U-shaped bridle assembly 13 by means of a bushing assembly 14 at the top of the hull 11 and a bushing assembly 15 at the bottom of the hull 11. Typically, the bridle assembly 13 is made from one inch diameter stainless steel tubing. A wiring cable 16 interconnects the surface equipment (not shown), such as power supply, control system, electronic analyzers, recorders, display screens and meters, with the equipment carried by the vehicle 10. The vehicle 10 is propelled and maneuvered through the water by means of a water nozzle 17 mounted on the front, a water nozzle 18 mounted on the rear, and a pair of water nozzles 19 and 20 rotatably mounted at each end of a wing-shaped forward extension 21 of the hull 11.

The cable 16 is run through an underwater connector 22, the inside of the lower branch of the bridle 13, the lower bushing assembly 15, and is connected to an electronic junction box 23 which typically contains the control and scan units for the television camera 12, a gyro compass, multiplexing equipment for decoding information sent down from the surface and for coding information derived from the equipment in the vehicle 10, and switching circuits for controlling the interconnections between the surface and the equipment in the vehicle.

The cables containing the electrical wiring to and from the various pieces of equipment in the scanner 10 interconnect with the junction box 23. The power, remote focus, target, vertical and horizontal trimpots, and a radio-frequency coaxial line for the television camera 12 are contained in a cable 24. A mercury vapor lamp 25, mounted in a horizontal slot in the front of the hull 11 and used to illuminate the field of view of the camera 12, is energized via a cable 26 (see FIG. 2). A water pump 27, which drives control water in fluid-flow series through switch valve 28 (FIG. 1) and a proportional valve 29 (FIG. 1), is energized via a cable 30. The switch valve 28 is energized via a cable 31 and the proportional valve 29 is energized via a cable 32. A servo motor 33 (FIG. 2) for rotating the nozzle 19 is energized via a cable 34, and a servo motor 35 (FIG. 2) for rotating the nozzle 20 is energized via a cable 36. In addition to performing the function of carrying the electrical wiring, the cables 24, 26, 30, 31, 32, 34 and 36 connect the junction box 23 in a closed air system with a high pressure air bottle 37.

The upper and lower branches of the bridle assembly 13 are detachably held together in the underwater connector 22. A cover consisting of two half sections 41 and 42 can be separated into two half sections and removed (as seen in FIG. 1) so that the bridle assembly 13 can be detached at the connector 22 and the hull 11 opened for maintenance and servicing without disturbing the wiring which is run through the cable 16. Each half section of the bridle assembly is associated with one-half section of the vehicle. The bushing assemblies 14 and 15 retain the ends of the bridle assembly 13 so that the hull 11 may be completely rotated by 360° within the bridle 13. A streamlined cover 43 (FIGS. 1 and 2) fits over the upper bushing assembly 14 and is prevented from rotating with the hull 11 by means of a slot 43' (FIG. 1) which straddles the upper branch of the bridle 13. Similarly, a streamlined cover 44 (FIGS. 2 and 3) fits over the lower bushing assembly 15 and is prevented from rotating with the hull 11 by means of a slot 44' (FIG. 3) which straddles the lower branch of the bridle 13. The bottom cover 44 may conveniently contain marker buoys to be described hereinafter, which are dropped to mark particular locations upon a signal from the surface. The streamlined members 41, 42, 43 and 44 serve to materially reduce the drag on the vehicle 10.

Figure 2:
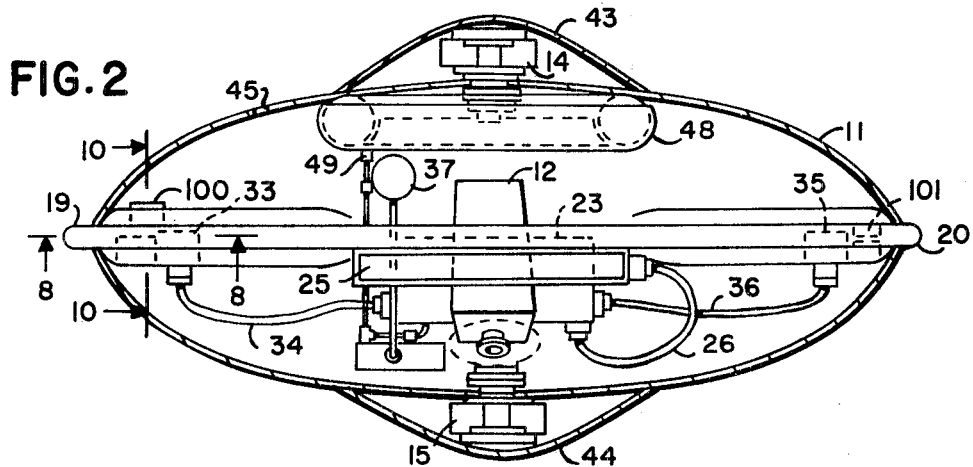
FIG. 2 is a transverse cross-sectional view taken along line 2—2 of FIG. 1 to illustrate the forward end of the underwater vehicle shown in FIG. 1.
Figure 3:
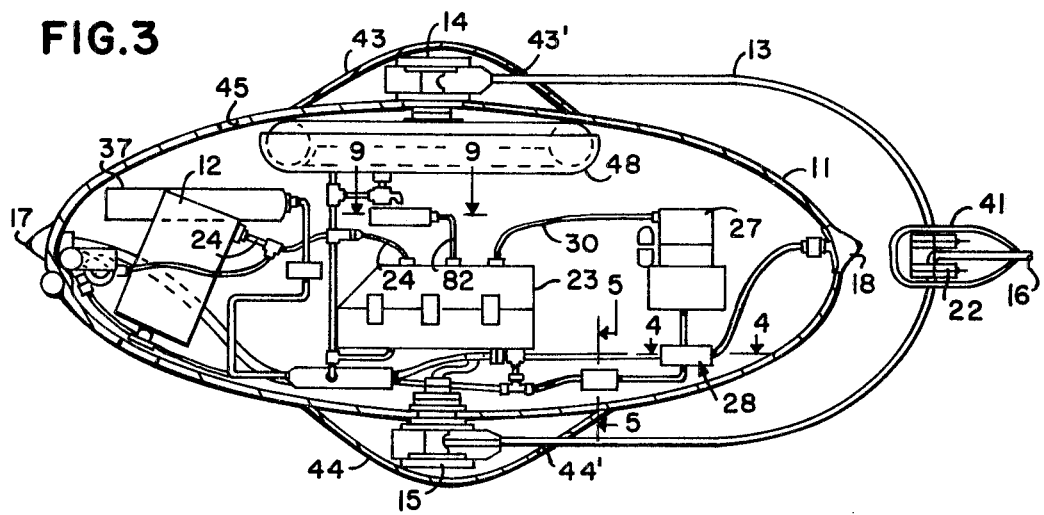
FIG. 3 is a longitudinal cross-sectional view taken along line 3—3 of FIG. 1 to show the longitudinal layout of the underwater vehicle shown in FIGS. 1 and 2.

Water is permitted to enter the hull 11 via a plurality of small openings 45 (FIGS. 2 and 3). For example there may be twenty openings 45 of one-inch diameter arranged in a semicircle on the top front of the hull 11. A pressure regulator 46 (FIG. 1) of the type commonly used with skin diving equipment is mounted in the lower half of the hull 11. The regulator 46 senses the water pressure and controls the air bottle 37 so as to maintain a pressure in the previously-described closed air system which is approximately one-eighth of a pound per square inch greater than the outside water pressure at any depth. This eliminates water leakage into the air system and permits the vehicle 10 to descend to greater depths without increasing the weight of the structure.

Typically, the bottle 37 contains four and one-half cubic feet of air at two thousand pounds per square inch to permit operation down to 4200 feet, and a safety switch 47 (FIG. 1) is included to provide a warning indication to the surface whenever the pressure in the bottle 37 falls below a predetermined level, for example 200 pounds per square inch. The pressure regulator 46 functions by admitting air from the bottle 37 into the closed air system until the inside air pressure at the regulator 46 is equal to the outside water pressure. In order to obtain the desired differential in pressure in the wire-carrying cables 24, 26, 30, 31, 32, 34, 36 extending from the junction box 23, the pressure regulator 46 is mounted approximately six inches below these cables. The valves 28 and 29 and the servo motors 33 and 34, also mounted above the pressure regulator 46, are also internally maintained at this elevated pressure. However, in view of the danger of damaging the vacuum envelopes in the television camera 12 and the lamp 25, these units are preferably air-sealed at their junction with the cables 24 and 26, respectively.

An emergency air bladder 48, which may be in a form similar to a tire inner tube disposed concentric with the upper bushing assembly 14, is connected in the closed air system downstream of the pressure regulator 46 (FIG. 1), via a load solenoid valve 49 (FIG. 1) and a vent solenoid valve 50 (FIG. 1). The solenoid valve 49 loads the bladded 48 from the secondary air supply of the pressure regulator 46 and the vent valve 50, upon activation from the surface, vents the bladder 48 to provide emergency flotation. The bladder 48 is also protected from an over pressure by a secondary regulator 48'.

In order to provide the necessary forces for propelling and maneuvering the vehicle 10, a pump intake manifold 52 (FIG. 1) admits some of the water, which has entered the hull 11 through the surface openings 45, through openings 52' where it is pumped by the pump 27 through an outlet pipe 53 into the switch valve 28 which, depending on its state, directs approximately 60% of the water either through a rear conduit 54 and out the rear nozzle 18, or through a front conduit 55 and out the front nozzle 17. The remaining approximately 40% of the water passes through a conduit 56 and into the proportional valve 29. The proportional valve 29 divides this approximately 40% input into two parts, one part being directed through a conduit 57 and out the rotatable nozzle 19 and the other part being directed through a conduit 58 and out the rotatable nozzle 20.

Figure 4:
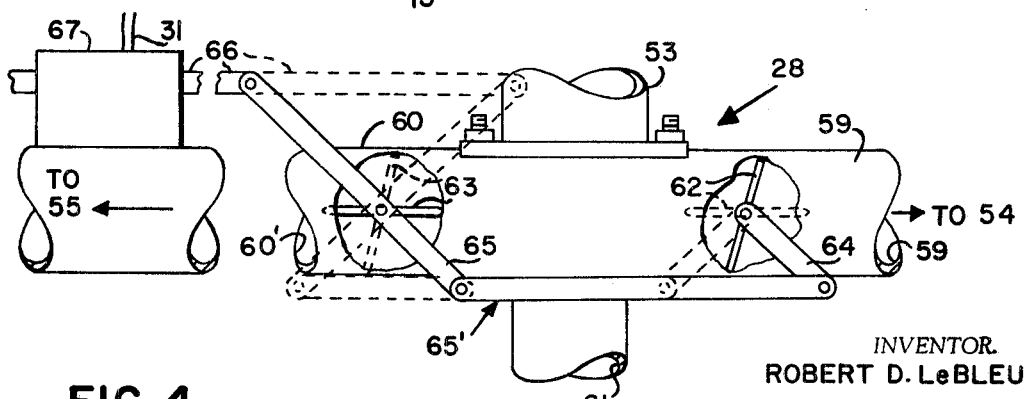
FIG. 4 is an enlarged cross-sectional view taken along line 4—4 in FIG. 3 to illustrate the detailed construction of a switch valve employed in the underwater vehicle of the present invention.

The detailed construction of the switch valve 28 is seen in FIG. 4. The valve 28 has three output ports 59, 60 and 61 which lead to the rear nozzle conduit 54, the forward nozzle conduit 55 and the proportional valve input pipe 56, respectively. The interior of the port 61 is unimpeded, whereas the interior of the port 59 has a rotatable plug or butterfly valve 62 and the interior of the port 60 has a rotatable plug or butterfly valve 63. The valves 62 and 63 are secured, in mutual perpendicular planes, to parallel arms 64 and 65, respectively, of a pivot linkage mechanism 65' driven by means of an arm 66 which extends through a solenoid 67. The linkage mechanism 65' has two stable positions depending on the excitation condition of the solenoid 67 and hence, the penetration of the arm 66 within the solenoid 67.

In one of these positions, shown in solid lines, the plug 62 is disposed longitudinally so that the port 59 is opened and the plug 63 is disposed transversely so that the port 60 is closed. In the other of these positions, shown in dotted lines, the plug 62 is disposed transversely so that the port 59 is closed and the plug 63 is disposed longitudinally so that the port 60 is opened. The ports 59 and 60 are of equal diameter and are dimensioned relative to the port 61 so that approximately 40% of the input water through the conduit 53 passes on through the conduit 56 in either of the two positions of the valve 28. The other approximately 60% of the input water passes through the conduit 54 when the valve 28 is in the state shown by the solid lines, or through the conduit 55 when the valve 28 is in the state shown by the dashed lines.

The detailed construction of the proportional valve 29 is seen in FIGS. 5, 6 and 7. The valve 29 may be a stable fluidic device. Within the housing of the valve 29, the input conduit 56 divides into the two equal conduit branches 57 and 58. Adjacent this housing is a reversible motor 70 which is coupled via a reduction gear box 71 to a rotating shaft 72. Eccentrically mounted on the shaft 72 are a pair of cams 73 and 74 with respective projections 73' and 74' extending in opposite directions transversely of the shaft 72. The cam 73 is mounted above the conduit 57, and the cam 74 is mounted above the conduit 58. When the shaft 72 is in the neutral position, the projection 73' of the cam 73 projects in one direction parallel to the conduit 57, and the projection 74' of the cam 74 projects in the opposite direction parallel to the conduit 58.

When the shaft 72 rotates in one direction, the projection 73' of the cam 73 rotates into the conduit 57 which is made of a flexible material at the point of contact, whereby the conduit 57 progressively restricts in cross-section with the rotation as shown in FIG. 7; and simultaneously the projection 74' of the cam 74 rotates away from the conduit 58. When the shaft 72 rotates in the opposite direction, the projection 74' of the cam 74 rotates into the conduit 58 which is also made of a flexible material at the point of contact, whereby the conduit 58 progressively restricts in cross-section with the rotation; and simultaneously the projection 73' of the cam 73 rotates away from the conduit 57. Consequently, the input through the conduit 56 can be divided into any desired proportion between the two output conduits 57 and 58 by rotating the shaft 72 to the appropriate position. The motor 70 has mounted on a gear train a potentiometer pot 70' for feedback information. The peripheral surfaces of the cams are curved from side-to-side to reduce downstream turbulence within the conduits engaged thereby.

FIG. 8 shows detailed construction of the rotatable junction between the conduit 57 and the nozzle 19 which is driven by the servo motor 33. The forward end of the nozzle 19 extends through a bearing 75 in the hull 11 and is formed into a right angle bend externally of the hull 11. The rear end of the nozzle 19 rotatably couples to the front end of the conduit 57 in a water-tight annular junction 76. The servo motor 33 reversibly rotates a gear 77, which meshes with a gear 78. The gear 78 is captured on the nozzle 19 so that rotation of the gear 77 results in 360° rotation of the nozzle 19 in the junction 76. A signal from the surface through the cable 34 operates the servo motor 33 to set a potentiometer 79 at a position corresponding to a desired angle of the forward end of the nozzle 19 in the plane perpendicular to the axis of the rear end of the nozzle 19, whereupon the gear 77 is rotated until the forward end of the nozzle reaches the desired angle. The detailed construction of the rotatable junction between the conduit 58 and the nozzle 20 which is driven by the servo motor 35 is identical to that just described, whereby the forward end of the nozzle 20 may be set at any desired angle by a signal from the surface through the cable 36.

In operation, the bridle 13 stabilizes the hull 11 in any given plane while permitting the hull 11 to rotate in this plane through 360° about the bushing assemblies 14 and 15, in order to scan the viewing field of the television camera 12. This rotation is effected in a controlled manner by pointing the nozzles 19 and 20 to the rear of the vehicle 10 and driving the proportional valve 29 to a position of providing greater thrust from the nozzle 19 for counterclockwise rotation as viewed from the top, or to a position of providing greater thrust from the nozzle 20 for clockwise rotation as viewed from the top. The lenticular shape of the hull 11 permits the movement to be executed with a minimum amount of drag.

In normal operation, the vehicle 10 is moved forward by positioning the switch valve 28 to provide forward thrust through the rear nozzle 18, which thrust is controllably aided by the thrust developed through the nozzles 19 and 20. In order to slow down, stop, or move backwards, the valve 28 is switched to provide reverse thrust through the forward nozzle 17 which is controllably counteracted by the forward thrust developed through the nozzles 19 and 20. Thus, control is maintained through the proportional valve 29 when the valve 28 is in the reverse thrust position as well as when the valve 28 is in the forward thrust position. The speed is also controlled by throttling the pump motor.

The attitude of the vehicle 10 is changed simply by rotating the nozzles 19 and 20 (by means of the servo motors 33 and 35). The lenticular shape of the hull 11 permits the necessary lift to be developed. To dive deeper, the nozzles 19 and 20 are rotated upward, and to ascend the nozzles 19 and 20 are rotated downward.

It is to be noted that, unlike conventional underwater vehicles with rudders and tails, the vehicle 10 of the present invention can move up or down, or rotate through any angle, without the necessity of moving forward. Accordingly it can be maneuvered and controlled with greater ease and precision.

Buoyance for the vehicle 10 is partly achieved through the pressurized closed air system connection to the air bottle 37, and further by filling the top half of the hull 11 with foam 80, for example an epoxy resin material formed around small, evenly-spaced air bubbles to form a foam with a density of thirty-six pounds per cubic foot. To insure neutral buoyancy under all conditions of water temperature and salinity, or to introduce negative or positive buoyancy, a variable buoyancy trim tank 81 which is connected in the closed air system with the junction box 23 by means of a cable 82 which also carries the electrical interconnections for the tank 81.

Figure 9:
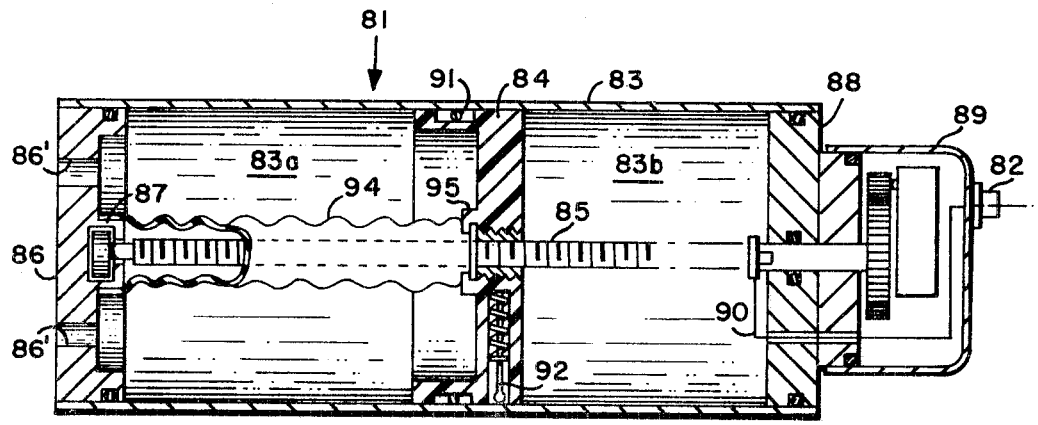
FIG. 9 is an enlarged cross-sectional view taken along line 9—9 in FIG. 3 to illustrate the buoyancy tank employed in the underwater vehicle of the present invention.

The detailed construction of the buoyancy trim tank 81 is seen in FIG. 9. A cylindrical stainless steel housing 83 is divided into two compartments 83a and 83b by means of a plastic piston 84 which is internally threaded for movement along an externally threaded rod 85. The compartment 83a has a plastic end plate 86 which rotatably supports one end of the rod 85 in a socket 87, and which has openings 86' for admitting water (which enters the hull 11 through the openings 45) into the compartment 83a. The compartment 83b is filled with air maintained at a pressure comparable (at any depth) to the water pressure in the compartment 83a, regardless of the position of the piston 84 along the rod 85, through the closed air line 82. The compartment 83a has an end plate 88 for supporting a small gear motor 89 which rotates a plastic extension 90 captured on the end of the threaded rod 85. The motor 89 thus rotates the rod 85 causes the piston 84 to move along the rod 85 while engaging the housing 83 in water-tight relation via a sliding piston ring 91, to thereby vary the relative size between the compartment 83a and 83b.

The piston 84 has inserted therein a spring loaded metallic plunger 92 which makes electrical contact between the rod 85 and the housing 83. The rod 85 is made of a material, such as high chromium content carbon steel, which has a high electrical resistance relative to that of the plunger 92 and the housing 83. Thus, the resistance of the electrical path from the housing 83 through the plunger 92 and down to the right-hand end of the rod 85 varies linearly as the piston 84 moves along the rod 85. This resistance is sensed by means of an electrical conductor 93 connected to the right-hand end of the rod 85 where it joins to the plastic extention 90. The entire length of the resistance-monitored rod 85, as well as the air compartment 83b, is sealed from the water in the compartment 83a by a plastic bellows 94 which extends between the socket 87 in the end plate 86 and an axially-aligned socket 95 in the piston 84.

In operation, the buoyancy of the trim tank 81 is finely adjusted by moving the piston 84 to vary the size of the air chamber 83b. As the piston 84 moves, the electrical resistance at the conductor 93 is monitored at the surface, via the cable 82, the junction box 23 and the main cable 16. This resistance is calibrated in relation to the volume of the air chamber 83b so that the motor 89 may be energized to move the piston 84 to the position corresponding to any desired buoyancy.

Figure 10:
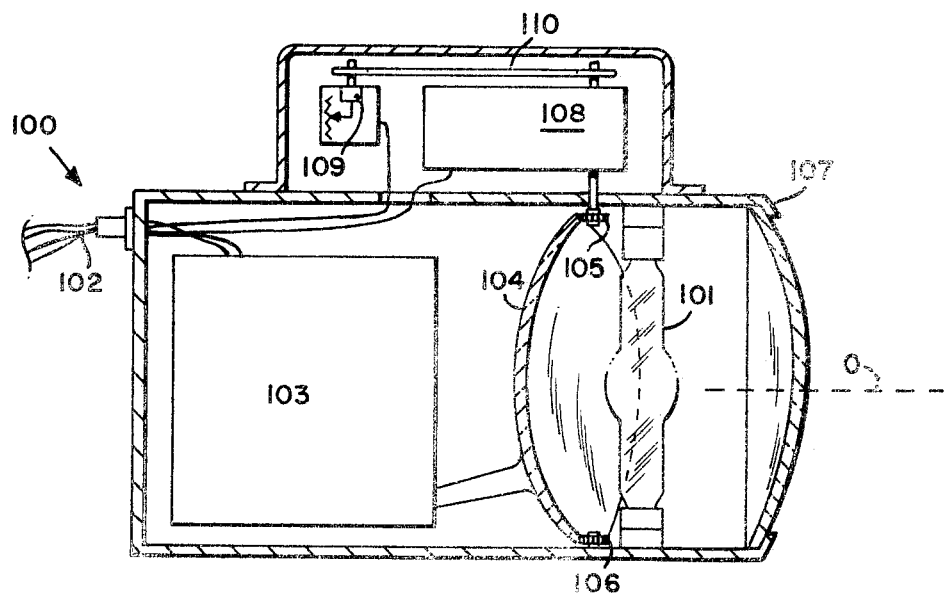
FIG. 10 is an enlarged cross-sectional view taken along line 10—10 in FIG. 2 to illustrate the construction of a lamp employed in the underwater device of the present invention.

To improve the operation of the television camera 12, it is desirable to mount beam-generating lamps 100 and 101 (FIGS. 1 and 2) at the lateral extremities of the wing 21. Such lamps may be used in the place of, or in addition to, the central lamp 25. The axis of the beams generated by each of the lamps 100 and 101 is shown by a dashed lines O and O', respectively (FIGS. 1 and 10). The lamps 100 and 101 are disposed so that the axes O and O' of these two beams intersect at the focal point $f$ of the television camera 12, as shown in FIG. 1. As the focal point $f$ varies in normal operation of the television camera 12, the direction of the beams of the lamps 100 and 101 is varied so as to maintain the beam intersection point coincident with the focal point $f$. In this manner, objects can be illuminated for camera viewing without interference from the back scatter of light from particles in the water path between the lens of the camera 12 and the focal point $f$.

The detailed construction of the lamp 100 is shown in FIG. 10. A mercury vapor discharge tube 101 is excited via a cable 102 and a standard ballast circuit 103. The light from the mercury vapor discharge tube 101 is focused by a reflector 104 into a beam along the symmetry axis O of the reflector 104. The reflector 104 is mounted at bearings 105 and 106 for rotation in a stationary lamp housing 107, under the action of a motor 108. The potentiometer in an O-ring belt 110 is controlled by the motor 108. The synchronization of the lights 100 and 101 and the television camera 12 is by an electrical link. The cable 102, carrying the wiring for the discharge lamp 101, the motor 108 and the potentiometer 109, is connected by an air tight seal with the junction box 23, in the same manner as described with respect to the cable 26 of the lamp 25.

In operation, the potentiometer control 109 causes the motor 108 to rotate the reflector 104 until the axis O of the beam from lamp 100 passes through the focal point $f$ of the television camera 12. A control system identical to that described for lamp 100 is provided for the lamp 101, so that the axis O' of the beam from lamp 101 also passes through the focal point $f$. These two beams thus intersect to illuminate the object being viewed by the camera 12 without the introduction of undesirable back scatter (see FIG. 1).

It may also be desirable to mount a rotatable prism, of the type commonly used for aerial surveys, on the lens of the television camera 12. This increases the vertical plane view angle of the camera and thus causes objects to stay in view for a longer period of time as the vehicle 10 passes over them.

Figure 11:
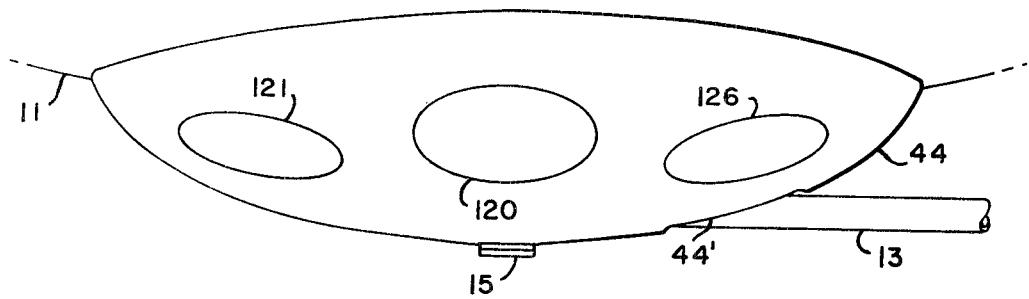
FIG. 11 is an elevational view of a modification of the bottom cover plate employed in the underwater vehicle of the present invention to illustrate marker buoys for the vehicle.
Figure 12:
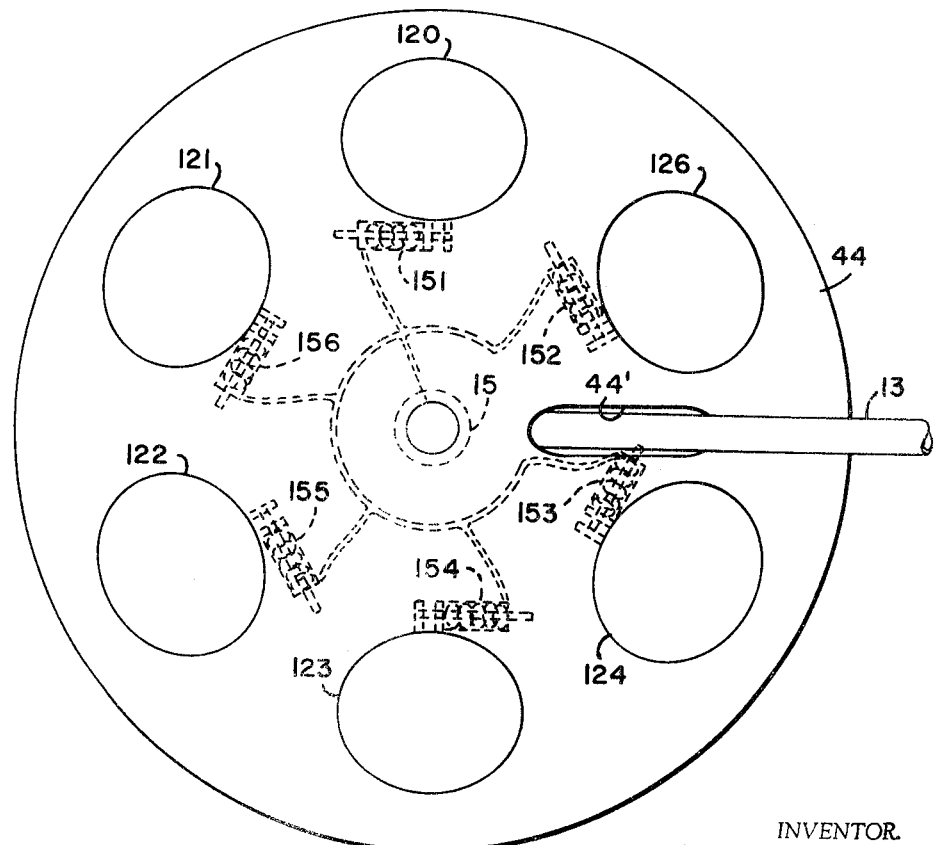
FIG. 12 is an enlarged bottom view of the bottom cover plate shown in FIG. 11.

For providing replaceable marker buoys, the bottom cover 44 is modified in the manner shown as a bottom cover 44' in FIGS. 11-13. The bottom cover 44' is formed, in the exemplary embodiment, with six releasable buoy cover sections 120-126. Disposed above the cover sections 120-125 are six replaceable buoys, respectively. In FIG. 13 is illustrated in detail one of the buoys 130. The marker buoy 130 is disposed above the cover section 126. The remaining marker buoys are of similar construction, operate as in a similar manner, and are similarly associated with the remaining cover sections.

The marker buoy 130 comprises an outer cylindrical housing 131 of suitable flexible material that engages the bottom cover 44' and particularly the portion thereof surrounding the periphery of the cover section 126. Disposed within the outer cylindrical housing 131 is an inner cylindrical housing 132. The cover section 126 is fitted and seated in snug relationship with the inner housing 132 and preferably sealed thereto through a suitable gasket arrangement when the flexible outer housing 131 is contracted. The outer shape of the cover section 126 conforms to the contour of the outer wall of the bottom cover 44. Thus, the cover sections are indexed to fit the slope of the farring.

Contained by the inner housing 132 and the cover section 126 are a plurality of floats 135a–135c, which are suitably interconnected through interconnecting monofilament lines. The floats 135a–135c, in the exemplary embodiment, are approximately the size of conventional pinp-pong balls. Attached to the float 135b is one end of a monofilament line 136, which in the typical embodiment is 700 yards in length and 45 pounds test line. The other end of that line 136 is wrapped around a spool or disc-shaped member 137, which is supported for rotation by a mushroom anchor 140, which is disposed below the top wall of the inner housing 132. Wound in a spring-like fashion and disposed between the floats 135a–135c and the disc-shaped member 137 is a flexible rod 141 with a suitable flag 142. In the exemplary embodiment, the flexible rod 141 is made from fiberglass and in the extended position is two feet in length. The lower section of the rod 142 is attached to the float 135b by a suitable monofilament line.

At the top of the outer housing 131 is a spring 145 under compression. Between the loaded spring 145 and the top wall of the inner housing 132 is a cover section 150, which is a mirror image of the cover section 126. Associated with each marker buoy is a solenoid and wiring, which are potted. Adjacent the cover sections 120-126 above the bottom cover 44' are the solenoids 151-156, respectively, with suitable wiring connections. A clamp 160 surrounds the outer housing 131 adjacent to the cover section 126. The clamp is hinged intermediate its ends and at its end portions has outwardly extending flanges for attachment to and receiving the rod of the solenoid 156 (FIG. 13A). When the solenoid 156 is de-energized, the rod thereof is retracted to cause the clamp 160 to contract for contracting the outer housing 132 to retain and hold the inner housing 132 and the cover section 126. When the solenoid 156 is energized, the rod thereof is extended to release the clamp 160 and the flexible outer housing 131 expands to release the cover section 126 and inner housing 132 to enable the spring 145 under compression to eject the inner housing 132 with the contents thereof. After the inner housing 132 is ejected from the bottom cover 44', the cover sections 150 seats in the area vacated by the cover section 126.

In the operation of the buoy marker 130, for example (FIG. 14), a signal in the vehicle 10 completes a suitable circuit to energize the solenoid 156. The rod of the solenoid 156 is extended to release the clamp 160 and the outer housing 131 expands to release the inner housing 132 and the cover section 126 to enable the spring 145 under compression to eject the inner housing 132 into the water. In so doing, the cover section 150 occupies the area vacated by the cover section 126. The outer housing after the buoys are ejected will be filled with water from the surrounding water in the farring area to maintain the previously existing balance and trim.

When the inner housing 132 is ejected into the water, the floats 135a–135c rise to the surface of the water. The flexible rod 141 erects itself from upward movement of the floats 135a–136 to display the flag 142. Simultaneously, the anchor 140 with the rotatable disc member 137 falls to the bottom or floor of the body of water.

It will be obvious to those skilled in the art that other equipment, such as tape recorders, depth sensors, temperature sensors, magnetometers, salinity content analyzers, water contamination analyzers and sonar systems, can be carried by the vehicle 10 and coupled to the closed air system terminal box 23 and the surface interconnecting cable 16 in a manner similar to that described for the illustrated equipment.

The underwater vehicle just described is not only efficient and versatile in operation, but it is of low-cost construction and is sufficiently small and lightweight that it can be carried by a rowboat or other small boat or operated directly from the shore.

Having thus described my invention, what I claim as new and desire to protect by Letters Patent is:

1. An underwater vehicle comprising a hull, said hull being formed with a flexible marker buoy compartment having an open end terminating at an exterior wall of said hull, a detachable cover seated at the open end of said compartment, a marker buoy disposed within said compartment, and a clamping means releasably engaging said compartment for retaining said cover at the open end of said compartment.

2. An underwater vehicle as claimed in claim 1 wherein a container is disposed within said compartment to contain said marker buoy, said container having an open end terminating at the exterior wall of said hull with said cover seated at the open end of said container.

3. An underwater vehicle as claimed in claim 2 and comprising spring means disposed between a closed end of said compartment and a closed end of said container to urge said container toward said cover, and means for releasing said clamping means to release said compartment for expansion to release said cover and to eject said container under the action of said spring means from said compartment.

4. An underwater vehicle as claimed in claim 3 and comprising a second cover disposed between said spring means and said closed cover end of said container, said second cover being arranged to seat in the area vacated by said first-mentioned cover after said container is ejected from said compartment.

5. An under water vehicle as claimed in claim 4 and comprising an anchor disposed within said container, and means connecting said anchor to said marker buoy.

6. An underwater vehicle as claimed in claim 3 wherein said means for releasing said clamping means is remotely controlled.

7. An underwater vehicle as claimed in claim 3 wherein said means for releasing said clamping means comprises a solenoid.

8. An underwater vehicle as claimed in claim 1 wherein the contour of the outer surface of said cover conforms to the contour of the outer surface of said exterior wall of said hull.

9. An underwater vehicle as claimed in claim 1 and comprising a plurality of said compartments, said containers and said covers being disposed equal radial distances and equal angular distances with respect to an axis of symmetry of said exterior wall, said containers being disposed within said compartments respectively and said covers being seated on said containers respectively.

References Cited

UNITED STATES PATENTS

| | | | |
|---|---|---|---|
| 1,719,838 | 7/1929 | Haselton | 9—9 |
| 2,818,586 | 1/1958 | Dayer et al. | 9—9 |

TRYGVE M. BLIX, Primary Examiner

U.S. Cl. X.R.

9—9